United States Patent [19]

Monroe et al.

[11] 4,431,982
[45] Feb. 14, 1984

[54] ELECTRICALLY CONDUCTIVE POLYDIORGANOSILOXANES

[75] Inventors: Carl M. Monroe; Randall P. Sweet, both of Midland, Mich.

[73] Assignee: Dow Corning Corporation, Midland, Mich.

[21] Appl. No.: 272,821

[22] Filed: Jun. 12, 1981

Related U.S. Application Data

[60] Continuation of Ser. No. 130,943, Mar. 17, 1980, abandoned, which is a division of Ser. No. 9,219, Feb. 5, 1979, Pat. No. 4,250,075.

[51] Int. Cl.³ ............................ H01C 3/06; H01C 7/00
[52] U.S. Cl. ........................... 338/214; 174/110 S; 252/511; 428/372; 428/378; 428/391; 338/66; 525/478; 524/860
[58] Field of Search ............ 338/66, 214; 525/478; 174/110 S; 252/511; 428/372, 378, 391

[56] References Cited

U.S. PATENT DOCUMENTS

| | | | |
|---|---|---|---|
| 3,029,808 | 7/1957 | Kagan | 128/206 |
| 3,284,751 | 10/1963 | Barker et al. | 338/66 |
| 3,665,052 | 5/1972 | Saam et al. | 525/106 |
| 3,680,027 | 7/1972 | Vitale | 338/214 |

FOREIGN PATENT DOCUMENTS 653350  12/1962  Canada ........................... 260/375 B

*Primary Examiner*—Wilbert J. Briggs, Sr.
*Attorney, Agent, or Firm*—Edward C. Elliott

[57] ABSTRACT

Compositions which cure to electrically conductive silicone elastomers containing greater than 2 percent by weight of phenyl radicals, are disclosed. The compositions comprise a mixture of polydiorganosiloxane and greater than 15 percent by weight of electrically conductive carbonaceous particles of less than 20 micrometers average diameter. Electrically conductive members of controlled resistivity are manufactured using these compositions. These electrically conductive members are useful as the core for improved automotive ignition cable. The ignition cable has a long useful life.

33 Claims, 2 Drawing Figures

ELECTRICALLY CONDUCTIVE POLYDIORGANOSILOXANES

This application is a continuation of application Ser. No. 130,943, filed Mar. 17, 1980, now abandoned which is a division of application Ser. No. 009,219 filed Feb. 5, 1979, now U.S. Pat. No. 4,250,075.

BACKGROUND OF THE INVENTION

1. Field of the Invention

This invention relates to improved electrically conductive polydiorganosiloxane compositions and to their use in ignition cable on spark ignited engines.

2. Description of the Prior Art

Electrically conductive compositions composed of materials filled with electrically conducting particles are well known in the art. Powders and fibers of metals and metal oxides as well as of carbon and graphite have been disclosed as useful in making compositions electrically conductive. The materials suggested have varied from a volatile vehicle such as alcohol to many types of resins and elastomers. Conducting compositions have been suggested for use in making resistance heating devices, electrical switches, shielding, gasketing, and electrical conductors.

In U.S. Pat. No. 3,029,808, Kegan describes a voltage detection system designed to measure voltages in the order of one millivolt. This detection system has an electrode which contacts the skin of a living animal. Kegan describes a satisfactory electrode which is composed primarily of a methyl phenyl polysiloxane gum with a filler of carbon black in an amount of 15 to 40 parts plus a vulcanizer of dicumyl peroxide.

In Canadian Pat. No. 653,350, Culver describes an ignition lead comprising a silicone rubber filled with electrically conductive carbon black or graphite and optionally a silica. The silicone rubber defined by Culver is a well-known elastomeric material based on organosiloxane polymers of the general unit formula

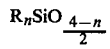

wherein R is a monovalent hydrocarbon radical or a halogenated monovalent hydrocarbon radical and n is 1.95 to 2.01. The silicone rubber can be vulcanized only by certain vulcanization agents because the presence of carbon black and graphite limits the vulcanization systems which can be used.

Culver teaches that at least 25 parts by weight conductive filler is required to give satisfactory conduction where the parts by weight are based on 100 parts by weight of siloxane polymer. Culver also teaches that a reinforcing silica filler is required to provide improved physical properties and that a filler loading of 40 parts by weight conductive carbon black or graphite and 25 parts by weight fume silica is an excellent combination of desired conductivity and good physical properties. The claims of Culver require at least 25 parts by weight conductive carbon black or graphite and at least 15 parts by weight fume silica both based on 100 parts by weight diorganosiloxane polymer. These compositions contain ditertiary butyl peroxide or dicumyl peroxide as vulcanizing agent. Culver also teaches that the use of some phenyl substituents present in the organosiloxane polymers can improve the heat stability.

The use of a conductive rubber coating in automotive ignition cable constructions is discussed in U.S. Pat. No. 3,284,751 by Barker and Shank. The conductive rubber (not further identified) dissolved in a solvent is used to impregnate a group of filaments with a conducting rubber.

Vitale, in U.S. Pat. No. 3,680,027, claims an ignition cable comprising a core and insulation, said core comprising a plurality of flexible fibers bonded together with a conductive silicone dispersion rubber.

The increased severity of the use requirements placed on ignition cables with passage of time has necessitated a search for acceptable materials o construction. The fibers used have changed from organic fibers such as linen and polyester to glass. The insulation has changed from styrene-butadiene to ethylene-propylene terpolymers or silicone rubber. In many cases, silicone rubber is also used as the jacketing material to provide the long-term heat aging requirements being placed on the cables. In addition to the higher use temperature requirements, the operating voltage of automotive ignition systems is also being increased from a nominal 17,000 volts of the past to as high as 40,000 volts at present.

The resistive conductor construction materials used in the past are no longer able to function for a sufficient length of time at the newly required temperatures and voltages. A means of evaluating ignition cable is a "High Energy Accelerated Life Test" described below. This test was originally run at room temperature with a standard ignition coil supplying the voltage. The test now requires use of new, higher voltage coils with the test specimens being tested at 260° C.

Previous ignition cables have used cores produced by using conductive acrylic dispersions, conductive silicone dispersions, and conductive silicone emulsions. None of these materials meet the present requirements. The improved compositions of this invention allow the manufacture of ignition cable core which will meet the current requirements.

The compositions of the prior art used in the manufacture of resistive core as the conductive member in automotive ignition cables were usually hydrocarbon solvent dispersions or water emulsions. A great deal of energy is used to dry and cure such a coating. The preferred compositions of the present invention do not require a solvent so the energy used to cure the coating is a small fraction of that previously used.

SUMMARY OF THE INVENTION

In the search for improved, electrically conductive, silicone elastomeric compositions, it was found that the useful life of automotive ignition cables of the type having a controlled resistivity core could be greatly improved by the addition of phenyl containing polymers to the composition.

The industry evaluates the expected life of automotive ignition cable by use of a "High Energy Accelerated Life Test". In this test the change in electrical resistance is monitored as the sample is subjected to high voltage electrical impulses and elevated temperatures. Ideally the electrical resistance doesn't change. It has now been discovered that the rate of change in electrical resistance can be greatly reduced by using silicone polymers containing phenyl radicals in an electrically conductive, polydiorganosiloxane composition used in the manufacture of the controlled resistivity conductive member used as the core in this type of cable.

It is an object of this invention to provide an improved electrically conductive, curable polydiorganosiloxane composition.

It is an object of this invention to provide a method of improving the useful life of automotive ignition cable.

It is an object of this invention to provide an improved conductive member useful as the controlled resistivity core of an automotive ignition cable.

It is an object of this invention to provide an improved automotive ignition cable.

DESCRIPTION OF THE INVENTION

This invention relates to a method of improving the useful electrical life of automotive ignition cable, of the type having a controlled resistivity core, when subjected to high voltage electrical impulses, the method consisting essentially of coating non-metallic fibers with an electrically conductive composition comprising a polydiorganosiloxane having greater than 2 percent by weight phenyl radicals based on the weight of the composition, the amount of phenyl radical present being increased as the use temperature is increased to that amount necessary to extend the useful electrical life at use temperature, and greater than 15 percent by weight of electrically conductive carbonaceous particles of less than 20 micrometers average diameter, using the coated non-metallic fibers as the controlled resistivity core.

Figure 1:
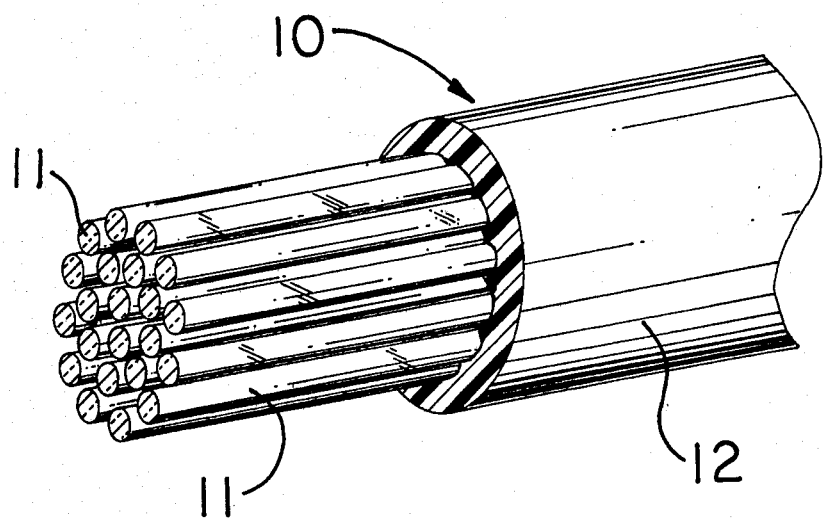
FIG. 1 is the controlled resistivity core.

FIG. 1 shows the controlled resistivity core 10. The controlled resistivity core 10 consists essentially of non-metallic fibers 11 coated with an electrically conductive composition 12. The non-metallic fibers 11 can be either electrically conductive or electrically non-conductive. The electrically conductive composition 12 comprises a polydiorganosiloxane having greater than 2 percent by weight phenyl radicals based upon the weight of the composition and greater than 15 percent by weight of electrically conductive carbonaceous particles of less than 20 micrometers average diameter. The combination of the required phenyl radicals and the required electrically conductive carbonaceous particles provides a controlled resistivity core 10 having unique properties in its ability to maintain its electrical resistivity on exposure to high voltage electrical impulses, such as those found in automotive ignition cable.

Figure 2:
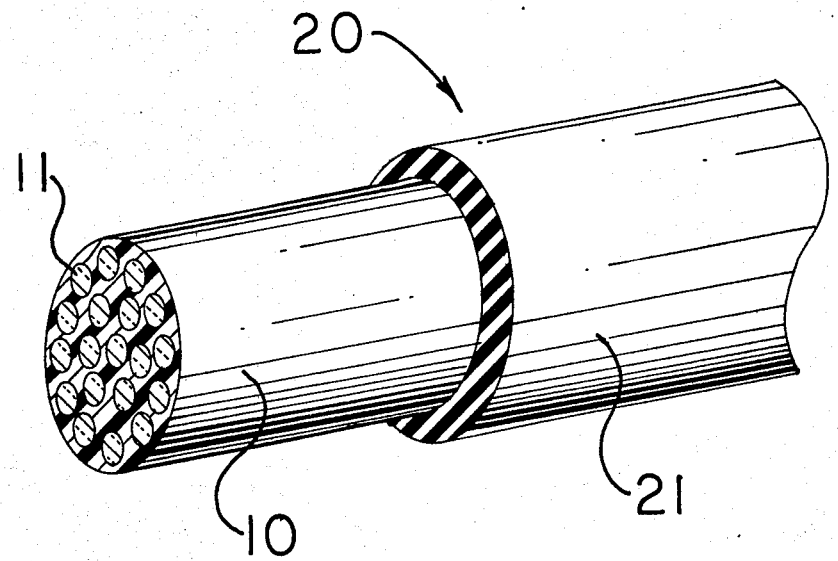
FIG. 2 is the automotive ignition cable.

FIG. 2 shows an automotive ignition cable 20. The cable 20 is produced by applying insulation 21 over the controlled resistivity core 10 to electrically isolate the core 10 from the surroundings and prevent any loss of electrical current flowing through the core 10.

This invention relates to an improved composition comprising a curable vinyldiorganosiloxy endblocked polydiorganosiloxane, the organic radicals being selected from the group consisting of methyl, ethyl, phenyl, and 3,3,3-trifluoropropyl radicals, there being from 0 to 50 inclusive percent 3,3,3-trifluoropropyl radicals, and from 0 to 50 inclusive percent phenyl radicals, all percentages of radicals being based on the total number of organic radicals in the polydiorganosiloxane; greater than 15 percent by weight, based on the weight of the composition, of carbonaceous particles of less than 20 micrometers average diameter; a crosslinking agent consisting of a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the composition; a platinum-containing catalyst, soluble in the polydiorganosiloxane, and present in an amount sufficient to provide at least 1 part by weight of platinum for every one million parts by weight of the polydiorganosiloxane; an amount of a platinum catalyst inhibitor sufficient to give the desired shelf life, and optionally a phenyl-containing polysiloxane; the composition further restricted in that there must be present greater than 2 percent by weight of phenyl radicals based on the weight of the cured composition, said phenyl radical being present in either the vinyldiorganosiloxy endblocked polydiorganosiloxane, the crosslinking agent, or phenyl-containing polysiloxane separately or in combination.

This invention relates to an improved composition useful in the manufacture of improved automotive ignition cables.

Presently used automotive ignition cables are of a type having an electrically conductive member as the core. The degree of electrical conductivity, or conversely, the degree of electrical resistance, is very carefully controlled as a means of suppressing the amount of radio frequency interference emanating from the engine when it is in operation. The emanations originate in the spark at the spark plug and the ignition cable acts as an antenna for the radio frequency currents produced unless it is designed to prevent or suppress their passage up the ignition cable. One method of such suppression has been the development of ignition cables having a controlled distributed resistance core.

In U.S. Pat. No. 3,284,751, Barker and Shank have described such an ignition cable and a method of applying terminals on the ends of the cable to attach it between the coil and the spark plug. U.S. Pat. No. 3,284,751 is hereby incorporated to illustrate a construction of automotive ignition cable.

A simplified type of cable construction is also used consisting only of a controlled resistivity core member with an elastomeric extrusion over it serving as both insulation and jacket.

The advancement of automobile design has resulted in the need for ignition cable capable of operating for long periods of time at high operating voltages and at higher temperatures without failure. The ignition cable normally fails by an unacceptable rise in the resistivity of the core member during use. When the resistivity of the cable becomes too high, the spark plug begins to fail to ignite the fuel mixture on every stroke. This allows unburned fuel to flow into the exhaust system. This destroys the catalytic emission control devices and thus increases the amount of undesirable emissions from the automobile.

One of the methods of evaluating the expected life of automotive ignition cables is by testing samples according to a procedure and using equipment described in a "High Energy Accelerated Life Test". A model ignition system is constructed using an electronic ignition module and high voltage ignition coil both of the type currently being used in production operations. The electronic ignition module is powered by a 14 volt direct current power source and triggered by a 60 hertz, 8 volt source so that it produces 3,600 pulses per minute. The output of the module goes to a high voltage ignition coil. The primary high voltage current from the coil goes through the test piece, then across a spark gap set to require 20 kilovolts impressed voltage before the spark forms. The test stand uses 4 of these systems so that replicate samples can be tested. The device is constructed in such a manner that the test pieces can be placed in an oven so that they can be subjected to any desired temperature while being tested.

The resistance of the 2 inch long test specimen is measured at the beginning of the test. Measurements are then taken during the test cycle. A doubling of the original resistance is commonly used as a failure point. The test cycle used and the time to failure allow an estimate of the relative life of the cable being tested when it is used in an automobile.

It has now been discovered that by using the composition of this invention in the manufacture of the core used to construct the cable, the life of the cable as measured by the "High Energy Accelerated Life Test" can be greatly extended.

The core of an automotive ignition cable is the part carrying the electrical current. It was originally constructed of metallic wire as in common electrical cable. Then it was discovered that the operating engine interfered with radio and television reception due to the radio frequency currents set up by the spark at the spark plug and radiating through the ignition cable. It was found that by making the cable core with a certain resistance the radiation of the operating cable could be greatly restricted while still allowing current to flow to the spark plug and cause a spark to ignite the fuel. A useful range of resistance is about 3,000 to 7,000 ohms per 30 cm of cable. If the resistance is much below this, the radiations are not sufficiently suppressed. If the resistance is much above this, the voltage at the spark plug may not be high enough to cause a reliable spark. Ideally each cable on an engine would have the same total resistance. Since the cables are different lengths the unit resistance of each cable would have to be different. Practically, it has been found that cable within the stated range functions satisfactorily in a majority of situations.

The unit resistivity of a core construction is controlled during the manufacturing process by the conductivity of the fibers used in the core and by the conductivity of the conductive composition used to coat the fiber in the manufacture of the core.

Modern ignition cables can be required to operate at temperatures approaching 260° C., therefore, the fibers used in the core must be capable of withstanding such temperatures. Glass fibers are most commonly used. Aramid fibers are also useful.

If the core design requires that the fibers be conductive, the individual fibers may be coated with conductive particles, for instance graphite particles, before the fibers are formed into a roving to provide an electrically conductive roving. Such roving is commercially available either with a spiral thread enclosing the roving to hold it together or with a braid over it to form a base member. Conductive roving may also be produced by the simultaneous use of nonconducting fibers such as glass or aramid with conducting fibers such as carbon or graphite.

The insulation, which is applied over the conductive core member, must be stripped off in the process of attaching the cable terminals. A coating must be applied over the base member so that a smooth non-adhering surface is presented to the insulation, allowing easy removal of the insulation. This coating is also the surface in contact with the metal connector at each end of the cable, so the coating must be electrically conductive as the current flows through it on its way from the coil to the spark plug.

Several types of polydiorganosiloxane elastomeric formulations have been successfully developed for use as the coating material used to produce the electrically conductive member. These formulations have been hydrocarbon solvent dispersions, water based emulsions, and solventless, flowable compositions. The polymers used are polydimethylsiloxanes of various types. The electrical conductivity is created by using fillers consisting of fine carbon black or graphite particles on the order of 5 micrometers or less average diameter. The electrical resistivity of the cured composition can be controlled within limits by the amount and type of electrically conductive filler used. A certain amount of conductive filler is needed to give electrical conductivity, commonly greater than about 15 weight percent of the composition. As more filler is added, the composition becomes more conductive but the properties of the composition both before and after curing are affected, thus setting an upper limit that is practical of about 40 weight percent.

Use of polydimethylsiloxane has proven desirable as compositions produced from these polymers have been shown to operate satisfactorily at higher use temperatures than the organic polymers previously used. These polymers also give compositions that cure to give a non-adhering surface when used with many insulation materials. The insulation is thus easily stripped off of the core member during the attachment of the connector to the cable when the core member is produced with a polydimethylsiloxane based composition.

The currently available polydimethylsiloxane based conductive compositions have not produced electrically conductive members capable of yielding cores useful in ignition cable that would withstand the present requirements when measured in the "High Energy Accelerated Life Test". The failure criteria has been changed from 72 hours test time at room temperature without a doubling of electrical resistance to 48 hours test time at 260° C.

According to the present invention, the performance of ignition cable can be improved to the point of meeting the test requirements of the procedures of the "High Energy Accelerated Life Test". This improvement in ignition cable performance can be accomplished by using phenyl-containing materials in electrically conductive curable polydiorganosiloxane compositions which have previously been used to make ignition cable.

The degree of improvement in the useful life of an ignition cable is dependent upon the amount of phenyl radical present in the composition. As little as about 2 weight percent of phenyl radical based on the weight of the total solids of the composition gives a measurable improvement in the useful life as predicted by the test when tested at room temperature. Even when the test is conducted at room temperature, the ignition cable test piece is heated to an elevated temperature by the high electrical currents flowing through it. As the temperature of the test is raised, the amount of phenyl radical necessary to extend the useful life of the cable increases.

It is necessary to use as high as about 25 percent by weight of phenyl radical in a composition used to manufacture cable capable of providing a useful life at 260° C. The amount of phenyl radical necessary in the composition to meet the use requirements depends on the severity of the conditions. The amount of phenyl radical necessary to pass a given test criteria will depend upon the composition of the conductive composition being improved. The components of the construction can have an effect on the life of the cable. If the filaments in the core are conductive, it is not necessary that the coating composition have a high electrical conductivity because a portion of the current will be carried by the filaments instead of all the current being carried by the coating. If the amount of electrically conductive carbonaceous particles in the composition is increased, the amount of phenyl radicals needed to reach a specified useful life can be reduced. For example, an embodiment of this invention based on a hydrocarbon dispersion composition containing 21 weight percent acetylene black and 12 weight percent phenyl radical did not have as long a useful life as a similar composition containing 32 weight percent acetylene black and 10 weight percent phenyl radical, when tested at 260° C. A simple set of experiments can be used to establish the amount of phenyl radical necessary in a particular case.

The phenyl radical can be added in many ways. Compositions built from polydiorganosiloxane can have phenyl radical present on the polydiorganosiloxane chain. A phenyl-containing polysiloxane liquid can be added to a composition containing a curable vinyldiorganosiloxy endblocked polydiorganosiloxane liquid or gum. The polydiorganosiloxane can be a block copolymer such as a copolymer of polyalphamethylstyrene and polydimethylsiloxane. It does not appear that the manner in which the phenyl radical is added is important, only that sufficient phenyl radical be present in the composition to give the degree of improvement in useful life that is desired.

The curable vinyldiorganosiloxy endblocked polydiorganosiloxane has organic radicals selected from the group consisting of methyl, ethyl, phenyl, and 3,3,3-trifluoropropyl. The phenyl or 3,3,3-trifluoropropyl radicals can be present in an amount from 0 to 50 percent inclusive, all percentages being based on the total number of organic radicals in the vinyldiorganosiloxy endblocked polydiorganosiloxane. The polydiorganosiloxane is endblocked with triorganosiloxy groups having the organic radical selected from those listed above plus vinyl radical.

In a preferred embodiment of this invention the triorganosiloxy endblock group contains a vinyl radical so that the polydiorganosiloxane contains an average of two silicon-bonded vinyl radicals per molecule with only one vinyl radical bonded to any one silicon atom.

Various viscosities of the vinyldiorganosiloxy endblocked polydiorganosiloxane can be used in this invention. When a hydrocarbon solvent is used to make a solvent dispersion the vinyldiorganosiloxy endblocked polydiorganosiloxane can be a gum since the solids of the composition can be diluted with the solvent to the point that the solvent dispersion can be applied to the base core fibers. If the embodiment being used is to be applicable to a liquid polymer system, the viscosity of the vinyldiorganosiloxy endblocked polydiorganosiloxane is preferrably between 0.1 to 100 Pa.s at 25° C. as it is then necessary for the composition to be of a pumpable viscosity. Curable vinyldiorganosiloxy endblocked polydiorganosiloxanes such as those described are well known in the art. Many are commercially available.

The polydiorganosiloxane can be a block copolymer such as the block copolymers described in U.S. Pat. No. 3,665,052 by Saam et al. which is hereby incorporated by reference to describe the block copolymers and their method of manufacture. The ratio between the organic block and the polydiorganosiloxane block can be chosen to give the desired amount of phenyl radical content in the completed composition of this invention. A preferred copolymer for use in this invention is one containing 50 weight percent polyalphamethylstyrene-styrene blocks and 50 weight percent polydimethylsiloxane blocks. It is polymerized to a point where the product is a thermoplastic film former. In this embodiment of the invention, the copolymer does not have to be cured if the polymerization is sufficient to yield a copolymer with a melting point above the use temperature of the finished, fabricated ignition cable.

Phenyl radicals can also be added to the electrically conductive curable vinyldiorganosiloxy endblocked polydiorganosiloxane compositions of this invention by adding a liquid phenyl-containing polysiloxane such as a liquid polymethylphenylsiloxane where the endblocking group can be a triorganosilyl group with the organic radical selected from the same group as for the polydiorganosiloxane chain or the endblocking group can be a hydroxyl group. The viscosity of the liquid phenyl-containing polysiloxane should be high enough so that the liquid is non-volatile under any temperature expected during manufacture. The upper limit of viscosity is set by the desired viscosity of the completed composition. These phenyl-containing liquid polysiloxanes are well known in the art and are commercially available.

Another suitable method of adding phenyl radicals is adding a benzene soluble organopolysiloxane having monophenylsiloxane units, methylvinylsiloxane units, dimethylsiloxane units, monomethylsiloxane units, and trimethylsiloxy units. Organopolysiloxanes such as this are manufactured by well known techniques of hydrolyzing the appropriate organochlorosilanes.

In those embodiments of this invention in which the composition is a hydrocarbon solvent dispersion, the choice of solvent is not critical as long as the solvent will properly disperse the polydiorganosiloxane and other ingredients being used. Preferred solvents based on ability to disperse polydiorganosiloxane polymers, toxicity, and convenient boiling points and evaporation rates are toluene and xylene.

A most preferred embodiment of this invention is that in which the electrically conductive, curable vinyldiorganosiloxy endblocked polydiorganosiloxane composition to be improved is based on a vinyl-containing polydiorganosiloxane, as described above, cured by platinum catalyzed reaction with a polyorganohydrogensiloxane containing at least 3 silicon-bonded hydrogen atoms as a crosslinking agent. When the vinyldiorganosiloxy endblocked polydiorganosiloxane is of a gum viscosity, the composition is used with a hydrocarbon solvent to form a dispersion for application on the core member. When the vinyldiorganosiloxy endblocked polydiorganosiloxane is of a viscosity from 0.1 to 100 Pa.s at 25° C., the composition is used as a pumpable, 100 percent non-volatile mixture that can be applied to the core member by extrusion techniques used with other liquid silicone rubber materials.

The polyorganohydrogensiloxanes containing silicon-bonded hydrogen atoms are well known in the art such as described by Polmanteer et al. in U.S. Pat. No. 3,697,473 and Lee et al. in U.S. Pat. No. 3,989,668 which patents are hereby incorporated by reference to show examples of polyorganohydrogensiloxanes known in the art.

The polyorganohydrogensiloxanes useful for the present invention can be any siloxane having an average of at least 2.1 silicon-bonded hydrogen atoms per molecule and an average of no more than one silicon-bonded hydrogen atom per silicon atom. The remaining valences of the silicon atoms are satisfied by divalent oxygen atoms or by monovalent hydrocarbon radicals having less than 6 carbon atoms per radical such as methyl, isopropyl, tertiarybutyl and cyclohexyl, and phenyl, and 3,3,3-trifluoropropyl radicals. The polyorganohydrogensiloxanes can be homopolymers, copolymers, and mixtures thereof which contain siloxane units of the following types:

$R_2SiO$, $R_3SiO_{0.5}$, $H(CH_3)SiO$, $H(CH_3)_2SiO_{0.5}$, and $SiO_2$ units, where R is the monovalent hydrocarbon defined above. Some specific examples include polymethylhydrogensiloxane cyclics, copolymers of trimethylsiloxy and methylhydrogensiloxane units, copolymers of dimethylhydrogensiloxy and methylhydrogensiloxane units, copolymers of trimethylsiloxy, dimethylsiloxane, and methylhydrogensiloxane units, and copolymers of dimethylhydrogensiloxy, dimethylsiloxane, and methylhydrogensiloxane units. Preferably, the polyorganohydrogensiloxanes have an average of at least 5 silicon-bonded hydrogen atoms per molecule.

The compositions of this embodiment are cured with the aid of a catalyst which can be any of the platinum-containing catalysts that are known to catalyze the reaction of silicon-bonded hydrogen atoms with silicon-bonded vinyl groups and which are soluble in the vinyldiorganosiloxy endblocked polydiorganosiloxane. Platinum-containing catalysts which are not soluble in the vinyldiorganosiloxy endblocked polydiorganosiloxane are not sufficiently effective to provide for the compositions of this invention. A class of platinum-containing catalysts particularly suitable for use in the compositions of this invention are the complexes of chloroplatinic acid described by Willing in U.S. Pat. No. 3,419,593 which is hereby incorporated by reference to show the preparation of said complexes and the complexes per se. A preferred catalyst, described by Willing, is a platinum-containing complex which is the reaction product of chloroplatinic acid and symdivinyltetramethyldisiloxane.

The platinum-containing catalyst is present in an amount sufficient to provide at least one part by weight of platinum for every one million parts by weight of the vinyldiorganosiloxy endblocked polydiorganosiloxane. It is preferred to use sufficient catalyst so there is present from 5 to 50 parts by weight platinum for every one million parts by weight of vinyldiorganosiloxy endblocked polydiorganosiloxane. It is to be understood that amounts of platinum greater than the 50 parts per million stated above are also effective in the compositions of this invention but said larger amounts, especially when the preferred catalyst is used, are unnecessary and wasteful.

A mixture of vinyldiorganosiloxy endblocked polydiorganosiloxane, polyorganohydrogensiloxane, and platinum catalyst may begin to cure immediately on mixing at room temperature, therefore, it is necessary to inhibit the action of the catalyst at room temperature with a platinum catalyst inhibitor if the composition is to be stored before use.

One type of platinum catalyst inhibitor suitable for use is the acetylenic inhibitors described in U.S. Pat. No. 3,445,420 to Kookootsedes et al. which is hereby incorporated by reference to show the preparation of acetylenic inhibitors and their use as inhibitors.

A second type of platinum catalyst inhibitor is the olefinic siloxanes that are described in U.S. Pat. No. 3,989,667 to Chi-Long Lee and Ollie W. Marko which is hereby incorporated by reference to show the preparation of olefinic siloxanes and their use in silicone compositions as platinum catalyst inhibitors. In particular, olefinic siloxanes having the formula

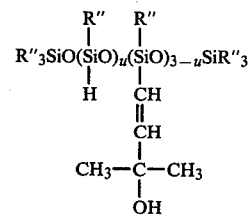

are preferred as the platinum catalyst inhibitor because the amount of these olefinic siloxanes can be chosed to inhibit the action of the catalyst at room temperature for periods as long as 3 months, but at temperatures in excess of 70° C. the inhibiting effect of the olefinic siloxane disappears and a normal cure rate is realized. Furthermore, the low volatility of these preferred olefinic siloxanes permits the use of the compositions of this invention in the open without concern for loss of the inhibitor due to evaporation. Each R" in the olefinic siloxanes above can be, independently, methyl, ethyl, phenyl, or 3,3,3-trifluoropropyl and u can be 1 or 2. It is to be understood that mixtures of olefinic siloxanes of the formula shown in which u is 1 and 2 are also operative as platinum catalyst inhibitor in the compositions of this invention.

A third type of platinum catalyst inhibitor suitable for use are the vinylorganocyclosiloxanes of the formula

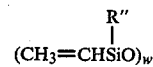

wherein R" is methyl, ethyl, phenyl, or 3,3,3-trifluoropropyl and w has an average value of from 3 to 6. Vinylorganocyclosiloxanes are well known in the organosilicon art, especially where R" is methyl and w is 3, 4, or 5.

The amount of platinum catalyst inhibitor to be used in the compositions of this embodiment is simply the amount needed to produce the desired shelf life and yet not extend the cure time of the compositions of this invention to an impractical level. This amount will vary widely and will depend upon the particular inhibitor that is used, the nature and concentration of the platinum-containing catalyst and the nature of the polyorganohydrogensiloxane.

Inhibitor added in amounts as small as one mole of inhibitor for every mole of platinum will in some instances cause an inhibition of the catalyst and afford a satisfactory shelf life. In other cases, considerably more inhibitor, such as 10, 50, 100, 500 and more moles of inhibitor for every mole of platinum may be needed to achieve the desired combination of shelf life and cure time. The exact amount of any particular inhibitor to be used in the compositions of this invention should be determined by simple experimentation.

The inhibiting effect of platinum catalyst inhibitor can be overcome by heating the compositions of this embodiment to a temperature of 70° C. or higher, preferably greater than 100° C.

The composition of this embodiment is obtained whenever the recited components are mixed in the proportions necessary to meet the above limits. The order of mixing is not critical, however if the preferred composition is used, it is preferred to have inhibitor present when vinyldiorganosiloxy endblocked polydiorganosiloxane, polyorganohydrogensiloxane, and platinum-containing catalyst are mixed, since a curing reaction involving these components begins immediately at room temperature if inhibitor is not present.

The best way to prepare the preferred compositions of this embodiment is to mix the vinyldiorganosiloxy endblocked polydiorganosiloxane, carbonaceous particles, platinum-containing catalyst, inhibitor and polyorganohydrogensiloxane crosslinking agent, in a dough mixer. Each component should be uniformly distributed in the mixture before adding the next. It is particularly important to have the inhibitor well distributed before the crosslinking agent is added as the curing reaction will begin if this is not done. Excessive shear during the mixing operation may lower the conductivity due to breaking up of the structure of the carbon black particles.

The electrically conductive carbonaceous particles used to give the composition its electrical conductivity are selected from a group consisting of carbon and graphite particles having an average particle diameter of less than 20 micrometers. It is preferable to have the particles with an average diameter of less than 5 micrometers as the smaller diameters make a more uniform mixture. The surface of the cured coating is smoother with the smaller particle size.

The preferred carbon particles are the acetylene carbon blacks as they exhibit a greater degree of electrical conductivity than other types of carbon black. A commercial form of this carbon black is Shawinigan ® acetylene black.

The preferred graphite particles are those ground to an average diameter of less than 5 micrometers. Both natural and synthetic graphites can be used, but if the preferred platinum catalyzed cure system is used the graphite must be evaluated to verify that impurities present, such as sulphur, do not interfere with the proper cure of the mixture. For this reason the synthetic graphites are preferable.

The electrically conductive member of this invention is produced by coating the composition of this invention over a bundle of continuous non-metallic filaments gathered together as in a roving, yarn, or cord.

The basic filaments can be any non-metallic fibers capable of withstanding the intended temperatures of manufacture and use. The preferred fibers are those made of glass, aramid fibers, carbon or graphite, and mixtures of such fibers. The fibers of glass or of aramid are electrically non-conductive, while the fibers of carbon or graphite are electrically conductive. Glass fibers are commercially available that are coated on their surface with conductive material such as graphite to yield a conductive fiber. The individual filaments are gathered together into a bundle as a roving, yarn, or cord. By adjusting the combination of types of filaments used, the electrical conductivity of the bundle can be adjusted to fall within the desired range.

Any suitable method may be used to coat the composition of this invention over the bundle of filaments. One embodiment is to disperse the composition in a suitable solvent such as toluene, xylene, or 1,1,1-trichloroethane, then conduct the bundle through a tank filled with the dispersion, through a die to control the amount of coating, and then through an oven to dry and cure the coating. This is normally a continuous operation with several passes through the coating apparatus to build the coating up to the desired thickness in a smooth and uniform manner. The completed electrically conductive member is typically of about 1.8 mm diameter with an electrical resistance of between 3,000 to 7,000 ohms per 30 cm of length. It is apparent that the conductivity of the finished member will be dependent both upon the conductivity of the bundle of fibers and the conductivity of the coating applied over the bundle.

One of the advantages of the compositions of the preferred embodiment of this invention in which the viscosity of the vinyldiorganosiloxy endblocked polydiorganosiloxane is between 0.1 and 100 Pa.s at 25° C. is that it can be used without dispersing in solvent. The viscosity of the composition can be low enough that the bundle of fibers can be coated using a modified crosshead arrangement similar to that customarily used to apply insulation to electrical wires. The bundle of fibers is fed through the crosshead in a continuous manner while the composition is forced around the bundle and shaped by the crosshead and exit die of the crosshead. The composition may be fed to the crosshead by using pumps or a pressure pot using air pressure as the driving force. Such a coating process is described in an article, "High Temperature Ignition Core Fabrication Using a Liquid Silicone Rubber", published by the Society of Automotive Engineers, Inc. as paper number 770866 at the Passenger Car Meeting in Detroit, Mich. on Sept. 26, 1977. The coated bundle of fibers is then cured by passing through a hot air oven. Since no solvent has to be driven off, the energy requirement to produce a finished, cured electrically conductive member is much less than that required by the previously described method. This method also results in a process with no volatile by-products that must be properly controlled and disposed of.

An improved automotive ignition cable of this invention is produced by using the electrically conductive member of this invention as the conductor of the cable. A suitable electrically insulating material such as an ethylene-propylene based or silicone rubber based material is extruded over the electrically conductive member of this invention using well known crosshead extrusion art. The insulation layer may be over braided with an open layer of reinforcement threads of heat stable fibers such as of glass or aramid, then a jacket layer is extruded over the braid layer to complete the construction. The jacket layer is commonly a heat and oil resistant elastomer such as silicone rubber. Alternate materials and constructions are disclosed in U.S. Pat. No. 3,284,751 by Barker et al. and in U.S. Pat. No. 3,680,027 by Vitale which patents are hereby incorporated by reference to illustrate automotive cable construction.

The improved automotive ignition cable of this invention is an advancement over the previous art in that because of the use of the composition of this invention to produce the electrically conductive member used as a conductor in the cable, the useful life of the cable is extended significantly.

The improvement is illustrated by the degree of improvement shown when the automotive cable is tested according to the "High Energy Accelerated Life Test". The improved cable of this invention produces a life at least 3 times that expected from the prior art cable when tested at room temperature. Cable tested at 260° C. shows that the cable of this invention should last at least 4 times as long as prior art cable.

The following examples are illustrative only and should not be construed as limiting the invention which is properly delineated in the claims. All parts are parts by weight.

EXAMPLE 1

The following illustrates the improvement resulting from the addition of phenyl-containing liquid polydiorganosiloxane to a conventional conductive silicone elastomer solvent dispersion.

A. A solvent dispersion was made by stirring 80 parts of a silicone rubber base consisting of 100 parts of vinyldimethylsiloxy endblocked polydiorganosiloxane gum (A) having, as a percentage of all organic radicals in the gum, 99.848 percent methyl radicals and 0.152 percent vinyl radicals, 20 parts of fumed rein-forcing silica with a surface area of approximately 400 square meters per gram, and 9 parts of hydroxyl endblocked polydimethylsiloxane fluid having about 4 weight percent silicon-bonded hydroxyl radicals into 335 parts of xylene. After the base was dispersed, 20 parts of electrically conductive acetylene black was added with additional stirring. When the dispersion was uniform, 3 parts of trimethylsiloxy endblocked polyorganosiloxane having about 37.5 mole percent dimethylsiloxane units and about 62.5 mole percent methylhydrogensiloxane units where the mole percent is exclusive of the trimethylsiloxy units and a silicon-bonded hydrogen atom content in the range of about 0.7 to 0.8 weight percent was added as a crosslinking agent. The dispersion was catalyzed with 0.22 part of a chloroplatinic acid complex of divinyltetramethyldisiloxane diluted with methylphenylvinylsiloxy endblocked polydimethylsiloxane to provide 0.7 weight percent platinum. The room temperature curing of the catalyzed dispersion was inhibited by adding 0.4 part of 3-methyl-1-butyn-3-ol.

The above solvent dispersion was applied to an electrically conductive glass fiber roving by dipping the roving in a bath of the dispersion, then heating the coated roving to drive off the solvent and cure the conductive silicone rubber coating. The glass fiber roving had been made electrically conductive by coating the fiber surfaces with graphite particles. The roving had a resistance of approximately 4000 ohms per 30 cm when measured with an ordinary ohmmeter. The coating was heated for 45 seconds at 200° C. Multiple passes were made to build up a conductive member with an average diameter of about 1.88 mm.

The conductive member was then used as the core in an ignition wire construction. The conductive core was insulated by extruding a jacket over the core with a conventional rubber extruder using a standard silicone rubber insulating compound as the jacket material. The jacket was cured by running it through a hot air oven exposing it to 300° C. for 60 seconds. The cured ignition wire had an outer diameter of 7 mm.

An accelerated life test device was used to evaluate the samples of ignition wire. The device consisted of a model automotive ignition system using an electronic ignition module and high voltage coil to produce a 20 kilovolt impulse current through the test sample at a rate of 3600 impulses per minute. The test samples were 50.8 mm long pieces of the ignition wire with a steel spark plug connector attached at one end and a brass coil connector attached at the other end. The "strip and fold" method of attachment described in U.S. Pat. No. 3,284,751 was used to attach the connectors.

The accelerated life test was run by placing 4 of the above described test samples in the test device. The initial electrical resistance between the two terminals of each test sample were measured and the average value recorded. The test was then started. At periodical intervals, the test was stopped momentarily and the resistances were measured and recorded. The change in resistance with time under test is a measure of the expected service life of the ignition wire. The slower the rate of change of resistance the longer the expected service life.

The results of the test were as shown in Table I. The recorded result in Table I is the average of 4 test samples.

B. A solvent dispersion similar to that of A, but containing a liquid phenyl-containing polydiorganosiloxane was prepared by mixing 70 parts of the vinyldimethylsiloxy endblocked polydiorganosiloxane gum (A) and 30 parts of hydroxyl endblocked liquid polymethylphenylsiloxane (B) having about 4.5 weight percent silicon-bonded hydroxyl radical into 532 parts of xylene. To the dispersion was added 28 parts of the acetylene black of A. The preparation was continued by adding 5 parts of the crosslinking agent of A, 0.25 part of the catalyst of A, and 0.1 part of the inhibitor of A.

The dispersion was then used to make test samples in the same manner as in A. The results of the tests on the samples were as shown in Table I.

Samples of B were also tested at elevated temperature. In the elevated temperature test, the test samples were heated 16 hours at 260° C. then 8 hours at room temperature. Resistance measurements were taken at the end of each exposure period. The cycle was repeated 3 times.

C. A solvent dispersion was made as in A using 100 parts of the vinyldimethylsiloxy endblocked polydiorganosiloxane gum (A) 1348 parts of 1,1,1-trichloroethane, 50 parts of the acetylene block of A, 5 parts of the crosslinking agent of A, 0.25 part of the catalyst of A and 0.1 part of the inhibitor of A.

The dispersion was then made into test samples in the same manner as in A. The test results were as shown in Table I.

D. A dispersion was made identical to B with the exception that 50 parts of the acetylene black was used and 620 parts of xylene. The dispersion was then made into test samples in the same manner as in A. The test results were as shown in Table I.

A comparison of the test results of A and B illustrates the improvement due to the presence of the liquid phenyl-containing polydiorganosiloxane in B. A comparison of the test results of C and D illustrates the improvement in D due to the presence of the liquid phenyl-containing polydiorganosiloxane. A comparison of B and D illustrates the improvement due to the increased amount of acetylene black in D. Increasing the amount of acetylene black as in C did not provide a satisfactory product since the liquid phenyl-containing polydiorganosiloxane was not present.

TABLE I

Accelerated Life Test

| | A | B | C | D |
|---|---|---|---|---|
| Acetylene Black, weight % | 19.3 | 21.1 | 32.2 | 32.2 |
| Phenyl Content, weight % | — | 12.1 | — | 10.4 |
| | Electrical Resistance, Ohms | | | |
| Tested at 23° C. | | | | |
| initial | 1000 | 700 | 750 | 400 |
| after 2 hours | 960 | — | 750 | — |
| 24 | ∞ | 550 | ∞ | 350 |
| 48 | | 575 | | 385 |
| 72 | | 715 | | 365 |
| Tested at 260° C. | | | | |
| initial | | 480 | | 430 |
| after 16 hours | | 460 | | 370 |
| 24 | | 560 | | 440 |
| 40 | | ∞ | | 390 |
| 48 | | | | 450 |
| 64 | | | | 410 |
| 72 | | | | 440 |

EXAMPLE 2

The following illustrate the improvement resulting from the addition of liquid phenyl-containing polydiorganosiloxane to an electrically conductive liquid silicone rubber.

A. A mixture was prepared of 100 parts of methylphenylvinylsiloxy endblocked polydimethylsiloxane (C) having a viscosity of 25° C. in the range of 0.3 to 0.5 Pa.s and an average ratio of organic radical per silicon atom in the range of 2.012 to 2.016; 28 parts of acetylene black; 5 parts of the crosslinking agent of Example 1,A; 0.25 part of the catalyst of Example 1, A; and 0.03 part of the inhibitor of Example 1, A.

This flowable mixture was extruded over conductive glass fiber roving to a diameter of 2.2 mm, then cured at 275° C. to yield an electrically conductive member.

This conductive member was then made into ignition wire and test samples were prepared from it in the same manner as detailed in Example 1, A. The test samples were evaluated using the accelerated life test of Example 1, A. The results of the test were as shown in Table II.

B. The mixture of A was repeated with the addition of 10 parts of the liquid polymethylphenylsiloxane (B). These samples were prepared and tested as in A. The results of the test were as shown in Table II.

C. The mixture of A was repeated with the addition of 10 parts of trimethylsiloxy endblocked liquid polymethylphenylsiloxane (D) having 42.3 weight percent phenyl content and a viscosity at 25° C. of about 0.5 Pa.s. Test samples were prepared and tested as in A. The results of the test were as shown in Table II.

D. The mixture of C was repeated but with 63 parts of the polydimethylsiloxane (C), 37 parts of the liquid polymethylphenylsiloxane (D) of C, 24 parts of the acetylene black, and 4 parts of a crosslinking agent of trimethylsiloxy endblocked polymethylhydrogensiloxane with a silicon-bonded hydrogen atom content of about 1.6 weight percent. Test samples were prepared and tested as in A. The results of the test were as shown in Table II.

The results shown in Table II illustrate the improvement due to the increasing amount of phenyl present in the mixture used to prepare the electrically conductive member. The liquid polymethylphenylsiloxane (B) used in B does not appear to be as efficient as the liquid polymethylphenylsiloxane (D) used in C.

TABLE II

Accelerated Life Test

| | A | B | C | D |
|---|---|---|---|---|
| Acetylene Black, weight % | 21.0 | 19.5 | 19.5 | 18.7 |
| Phenyl Content, weight % | — | 3.8 | 3.0 | 12.3 |
| | Electrical Resistance, Ohms | | | |
| Tested at 23° C. | | | | |
| initial | 750 | 700 | 730 | not tested |
| after 1 hour | ∞ | 600 | 600 | |
| 16 | | 550 | 530 | |
| 24 | | 550 | 500 | |
| 40 | | 530 | 500 | |
| 48 | | 520 | 490 | |
| 72 | | 800 | 490 | |
| 96 | | | 490 | |
| 168 | | | 480 | |
| | | | 470 | |
| Tested at 260° C. | | | | |
| initial | 740 | 720 | 690 | 510 |
| after 16 hours | ∞ | ∞ | 7,000 | 440 |
| 24 | | | 13,000 | 590 |
| 40 | | | ∞ | 550 |
| 48 | | | | 660 |
| 64 | | | | 580 |
| 72 | | | | 695 |

EXAMPLE 3

The following illustrate the improvement resulting from the addition of liquid phenyl-containing polydiorganosiloxane to an electrically conductive silicone rubber.

A. A mixture was prepared of 100 parts of liquid methylphenylvinylsiloxy endblocked polydimethylsiloxane (E) having a viscosity at 25° C. in the range of 1.8 to 2.4 Pa.s and an average ratio of organic radical per silicon atom in the range of 2.006 to 2.007; 25 parts of the acetylene black of Example 1,A; 6 parts of the crosslinking agent of Example 1, A; 0.3 part of the catalyst of Example 1, A; and 0.025 part of the inhibitor of Example 1, A.

This flowable mixture was extruded over conductive glass fiber roving, then cured and made into ignition wire and test samples were prepared from it in the same manner as detailed in Example 2, A. The test samples were evaluated using the accelerated life test of Example 1, A. The results of the test were as shown in Table III.

B. The mixture of A was modified by adding 8 parts of the liquid polymethylphenylsiloxane (D); 9 parts of a benzene soluble organopolysiloxane (F) having 37.5 mole percent monophenylsiloxane units, 20 mole percent methylvinylsiloxane units, 30 mole percent dimethylsiloxane units, 7.5 mole percent monomethylsiloxane units, and 5 mole percent trimethylsiloxy units with a phenyl content of about 29.9 weight percent and a vinyl content of about 5.5 weight percent; using 6.5 parts of the crosslinking agent instead of 6 parts and using 27 parts of the acetylene black instead of 25 parts.

The mixture was tested as in A. The results of the tests were as shown in Table III.

C. The mixture of B was repeated except that 60 parts of the liquid polymethylphenylsiloxane (D), 7 parts of the crosslinking agent, and 37 parts of the acetylene black were used. The mixture was tested as in A with the results as shown in Table III.

D. The mixture of C was repeated except that 70 parts of the liquid polymethylphenylsiloxane (D) and 40 parts of the acetylene black were used. The mixture was tested as in A with the results as shown in Table III.

TABLE III

| | Accelerated Life Test | | | |
|---|---|---|---|---|
| | A | B | C | D |
| Acetylene Black, weight % | 19.1 | 17.9 | 17.4 | 17.7 |
| Phenyl Content, weight % | — | 4.1 | 13.4 | 14.5 |
| | Electrical Resistance, Ohms | | | |
| Tested at 23° C. | | | | |
| initial | 750 | 1060 | 900 | 850 |
| after 1 hour | ∞ | 700 | 750 | 640 |
| 24 | | 660 | 815 | 620 |
| 48 | | 700 | 780 | 610 |
| 72 | | 700 | 800 | 620 |
| Tested at 260° C. | | | | |
| initial | 790 | 800 | 750 | 640 |
| after 16 hours | ∞ | 9000 | 430 | 430 |
| 24 | | 10,000 | 500 | 495 |
| 40 | | | 480 | 340 |
| 48 | | | 690 | 440 |
| 64 | | | 3000 | 320 |
| 72 | | | 4200 | 400 |

EXAMPLE 4

This example illustrates the use of different liquid phenyl-containing polydiorganosiloxanes. A mixture of 60 parts of the liquid polydimethylsiloxane (E); 40 parts of methylphenylvinylsiloxy endblocked polydiorganosiloxane copolymer (G) of dimethylsiloxane units and phenylmethylsiloxane units having about 25 weight percent phenyl radicals and a viscosity of about 2 Pa.s; 75 parts of the liquid polymethylphenylsiloxane (D); 9 parts of the organopolysiloxane hydrolyzate (F); 42 parts of acetylene black; 8.5 parts of the crosslinking agent of Example 1, A; 0.43 part of the catalyst of Example 1, A; and 0.025 part of the inhibitor of Example 1, A was prepared. There was 17.9 weight percent acetylene black and 19.03 weight percent phenyl radical in the mixture.

This flowable mixture was fabricated into test samples and evaluated as in Example 2, A. The results were:

| Accelerated Life Test | |
|---|---|
| Tested at 260° C. | Electrical Resistance, Ohms |
| Initial | 650 |
| after 16 hours | 470 |
| 24 | 520 |
| 40 | 490 |
| 48 | 530 |
| 64 | 550 |
| 72 | 590 |
| 88 | 550 |
| 96 | 610 |

EXAMPLE 5

This example illustrates the use of multiple sources of phenyl radicals in the mixture. A mixture of 100 parts of the polydiorganosiloxane copolymer (G); 43 parts of the polymethylphenylsiloxane (D); 14 parts of the liquid polymethylphenylsiloxane (B); 36 parts of acetylene black; 8.6 parts of the crosslinking agent of Example 1, A; 0.43 part of the catalyst of Example 1, A; and 0.04 part of the inhibitor of Example 1, A was prepared. There was 17.8 weight percent acetylene black and 25.3 weight percent phenyl radical in the mixture.

This flowable mixture was fabricated into test samples and evaluated as in Example 2, A. The results were:

| Accelerated Life Test | |
|---|---|
| Tested at 260° C. | Electrical Resistance, Ohms |
| Initial | 600 |
| after 16 hours | 370 |
| 24 | 460 |
| 40 | 400 |
| 48 | 490 |
| 64 | 420 |
| 72 | 510 |
| 88 | 540 |
| 96 | 460 |

EXAMPLE 6

This example illustrates the use of phenyl radicals in the base polymer only. A dispersion of 100 parts of a polyalphamethylstyrene-styrene polydimethylsiloxane block copolymer consisting of 50 weight percent alphamethylstyrene-styrene blocks and 50 weight percent polydimethylsiloxane blocks in 1125 parts of xylene was prepared. Into this dispersion was mixed 25 parts of acetylene black. There was 20 weight percent acetylene black and 26.1 weight percent phenyl radical in the dispersion calculated on a solids basis. This dispersion was coated on conductive glass fiber roving in the same manner as the dispersions of Example 1. The coated conductive member was then fabricated into an ignition cable and test samples prepared and evaluated as in Example 1, A. The results of the tests were:

| Accelerated Life Test | |
|---|---|
| Tested at 23° C. | Electrical Resistance, Ohms |
| Initial | 900 |
| after 2 hours | 720 |
| 24 | 750 |
| 48 | 750 |
| 72 | 750 |

A comparison of the above results with those of Example 1, A illustrates the significant improvement in the life of the ignition cable produced from a mixture containing phenyl radicals as compared to a mixture without phenyl radicals.

That which is claimed is:

1. A method of improving the useful electrical life of automotive ignition cable, of the type having a controlled resistivity core, when subjected to high voltage electrical impulses, the method consisting essentially of coating nonmetallic fibers with an electrically conductive composition comprising a polydiorganosiloxane having greater than 2 percent by weight phenyl radicals based on the weight of the composition, the amount of phenyl radical present being increased as the use temperature is increased to that amount necessary to extend the useful electrical life at use temperature, and greater than 15 percent by weight of electrically conductive carbonaceous particles of less than 20 micrometers average diameter, using the coated nonmetallic fibers as the controlled resistivity core.

2. The method of claim 1 in which the nonmetallic fibers are electrically nonconductive.

3. The method of claim 1 in which the nonmetallic fibers are electrically conductive.

4. A method of improving the useful electrical life of automotive ignition cable of the type having a controlled resistivity core when subjected to high voltage impulses, the method consisting essentially of coating nonmetallic fibers with an electrically conductive composition comprising a block copolymer in which there are present polyalphamethylstyrene-styrene blocks and polydimethylsiloxane blocks, the block copolymer having greater than 2 percent by weight phenyl radicals based upon the weight of the composition, the amount of phenyl radical percent being increased as the use temperature is increased to that amount necessary to extend the useful electrical life at use temperature, greater than 15 percent by weight of electrically conductive carbonaceous particles of less than 20 micrometers average diameter, and a hydrocarbon solvent capable of dispersing the composition, using the coated nonmetallic fibers as the controlled resistivity core.

5. The method of claim 4 in which the nonmetallic fibers are electrically nonconductive.

6. The method of claim 4 in which the nonmetallic fibers are electrically conductive.

7. A method of improving the useful electrical life of automotive ignition cable, of the type having a controlled resistivity core, when subjected to high voltage electrical impulses, the method consisting essentially of coating nonmetallic fibers with a composition selected from the group consisting of
(a) an electrically conductive composition consisting essentially of a curable vinyldiorganosiloxy endblocked polydiorganosiloxane, the organic radicals being selected from the group consisting of methyl, ethyl, phenyl, and 3,3,3-trifluoropropyl radicals, there being from 0 to 50 inclusive percent 3,3,3-trifluoropropyl radicals and from 0 to 50 inclusive percent phenyl radicals, all percentages of radicals being based on the total number of organic radicals in the polydiorganosiloxane; greater than 15 percent by weight, based on the weight of the composition, of carbonaceous particles of less than 20 micrometers average diameter; a crosslinking agent consisting of a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the composition; a platinum-containing catalyst, soluble in the polydiorganosiloxane, and present in an amount sufficient to provide at least 1 part by weight of platinum for every one million parts by weight of the polydiorganosiloxane; an amount of a platinum catalyst inhibitor sufficient to give the desired shelf life; and optionally a phenyl-containing polysiloxane; the composition further restricted in that there must be present greater than 2 percent by weight of phenyl radicals based on the weight of the cured composition, said phenyl radical being present in either the vinyldiorganosiloxy endblocked polydiorganosiloxane, the crosslinking agent, or phenyl-containing polysiloxane separately or in combination and
(b) an electrically conductive composition comprising a block copolymer in which there are present polyalphamethylstyrenestyrene blocks and polydimethylsiloxane blocks, the block copolymer having greater than 2 percent by weight phenyl radicals based upon the weight of the composition; greater than 15 percent by weight of electrically conductive carbonaceous particles of less than 20 micrometers average diameter; and a hydrocarbon solvent capable of dispersing the composition; using the coated nonmetallic fibers as the controlled resistivity core.

8. The method of claim 7 in which the nonmetallic fibers are electrically nonconductive.

9. The method of claim 7 in which the nonmetallic fibers are electrically conductive.

10. An electrically conductive member consisting essentially of electrically conductive nonmetallic fibers bonded together and coated with a cured electrically conductive composition where the composition in the uncured state consists essentially of a curable vinyldiorganosiloxy endblocked polydiorganosiloxane, the organic radicals being selected from the group consisting of methyl, ethyl, phenyl, and 3,3,3-trifluoropropyl radicals, there being from 0 to 50 inclusive percent 3,3,3-trifluoropropyl radicals and from 0 to 50 inclusive percent phenyl radicals, all percentages of radicals being based on the total number of organic radicals in the polydiorganosiloxane; greater than 15 percent by weight, based on the weight of the composition, of carbonaceous particles of less than 20 micrometers average diameter, a crosslinking agent consisting of a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the composition; a platinum-containing catalyst, soluble in the polydiorganosiloxane, and present in an amount sufficient to provide at least 1 part by weight of platinum for every one million parts by weight of the polydiorganosiloxane; an amount of a platinum catalyst inhibitor sufficient to give the desired shelf life; and optionally a phenyl-containing polysiloxane; the composition further restricted in that there must be present greater than 2 percent by weight of phenyl radicals based on the weight of the cured composition, said phenyl radical being present in either the vinyldiorganosiloxy endblocked polydiorganosiloxane, the crosslinking agent, or phenyl-containing polysiloxane separately or in combination.

11. The electrically conductive member in accordance with claim 10 in which the vinyldiorganosiloxy endblocked polydiorganosiloxane has a viscosity from 0.1 to 100 Pa.s at 25° C., and the carbonaceous particles consist of carbon or graphite particles present in an amount of between 15 and 40 percent by weight based on the weight of the composition.

12. The electrically conductive member in accordance with claim 10 in which there is present greater than 10 percent by weight phenyl radicals and the carbonaceous particles are present in an amount of between 15 and 40 percent by weight.

13. An electrically conductive member consisting essentially of electrically nonconducting fibers bonded together and coated with a cured electrically conductive composition where the composition in the uncured state consists essentially of a curable vinyldiorganosiloxy endblocked polydiorganosiloxane, the organic radicals being selected from the group consisting of methyl, ethyl, phenyl, and 3,3,3-trifluoropropyl radicals, there being from 0 to 50 inclusive percent 3,3,3-trifluoropropyl radicals and from 0 to 50 inclusive percent phenyl radicals, all percentages of radicals being based on the total number of organic radicals in the polydiorganosiloxane; greater than 15 percent by weight, based on the weight of the composition, of carbonaceous particles of less than 20 micrometers average diameter; a crosslinking agent consisting of a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the composition; a platinum-containing catalyst, soluble in the polydiorganosiloxane, and present in an amount sufficient to provide at least 1 part by weight of platinum for every one million parts by weight of the polydiorganosiloxane; an amount of a platinum catalyst inhibitor sufficient to give the desired shelf life; and optionally a phenyl-coating polysiloxane; the composition further restricted in that there must be present greater than 2 percent by weight of phenyl radicals based on the weight of the cured composition, said phenyl radical being present in either the vinyldiorganosiloxy endblocked polydiorganosiloxane, the crosslinking agent, or phenyl-containing polysiloxane separately or in combination.

14. The electrically conductive member in accordance with claim 13 in which the vinyldiorganosiloxy endblocked polydiorganosiloxane has a viscosity from 0.1 to 100 Pa.s at 25° C. and the carbonaceous particles consist of carbon or graphite particles present in an amount of between 15 and 40 percent by weight based on the weight of the composition.

15. The electrically conductive member in accordance with claim 13 in which there is present greater than 10 percent by weight phenyl radicals and the carbonaceous particles are present in an amount of between 15 and 40 percent by weight.

16. An electrically conductive member consisting essentially of nonmetallic fibers bonded together and coated with a cured electrically conductive composition where the composition in the uncured state comprises a polydiorganosiloxane having greater than 2 percent by weight phenyl radicals based on the weight of the composition, the amount of phenyl radical present being increased as the use temperature is increased to that amount necessary to extend the useful electrical life at use temperature, and greater than 15 percent by weight of electrically conductive carbonaceous particles of less than 20 micrometers average diameter.

17. The electrically conductive member of claim 16 in which the nonmetallic fibers are electrically nonconductive.

18. The electrically conductive member of claim 16 in which the nonmetallic fibers are electrically conductive.

19. An electrically conductive member consisting essentially of nonmetallic fibers bonded together and coated with a cured electrically conductive composition where the composition in the uncured state comprises a block copolymer in which there are present polyalphamethylstyrene-styrene blocks, and polydimethylsiloxane blocks, the block copolymer having greater than 2 percent by weight phenyl radicals based upon the weight of the composition, greater than 15 percent by weight of electrically conductive carbonaceous particles of less than 20 micrometers average diameter, and a hydrocarbon solvent capable of dispersing the composition.

20. The electrically conductive member of claim 19 in which the nonmetallic fibers are electrically nonconductive.

21. The electrically conductive member of claim 19 in which the nonmetallic fibers are electrically conductive.

22. An improved automotive ignition cable of the type having a controlled resistivity, electrically conductive member covered with an electrically insulating material wherein the improvement comprises the use of a conductive member consisting essentially of nonmetallic fibers bonded together and coated with a cured electrically conductive composition where the composition in the uncured state comprises a polydiorganosiloxane having greater than 2 percent by weight phenyl radicals based on the weight of the composition, the amount of phenyl radical present being increased as the use temperature is increased to that amount necessary to extend the useful electrical life at use temperature, and greater than 15 percent by weight of electrically conductive carbonaceous particles of less than 20 micrometers average diameter.

23. An improved automotive ignition cable of the type having a controlled resistivity, electrically conductive member covered with an electrically insulating material wherein the improvement comprises the use of a conductive member consisting essentially of nonmetallic fibers bonded together and coated with a cured electrically conductive composition where the composition in the uncured state comprises a block copolymer in which there are present polyalphamethylstyrene-styrene blocks, and polydimethylsiloxane blocks, the block copolymer having greater than 2 percent by weight phenyl radicals based upon the weight of the composition, greater than 15 percent by weight of electrically conductive carbonaceous particles of less than 20 micrometers average diameter, and a hydrocarbon solvent capable of dispersing the composition.

24. An improved automotive ignition cable of the type having a controlled resistivity, electrically conductive member covered with an electrically insulating material wherein the improvement comprises the use of a conductive member consisting essentially of electrically conductive nonmetallic fibers bonded together and coated with a cured electrically conductive composition where the composition in the uncured state consists essentially of a curable vinyldiorganosiloxy endblocked polydiorganosiloxane, the organic radicals being selected from the group consisting of methyl, ethyl, phenyl, and 3,3,3-trifluoropropyl radicals there being from 0 to 50 inclusive percent 3,3,3-trifluoropropyl radicals and from 0 to 50 inclusive percent phenyl radicals, all percentages of radicals being based on the total number of organic radicals in the polydiorganosiloxane; greater than 15 percent by weight, based on the weight of the composition, of carbonaceous particles of less than 20 micrometers average diameter, a crosslinking agent consisting of a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, pheny radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the composition; a platinum-containing catalyst, soluble in the polydiorganosiloxane, and present in an amount sufficient to provide at least 1 part by weight of platinum for every one million parts by weight of the polydiorganosiloxane; an amount of a platinum catalyst inhibitor sufficient to give the desire shelf life; and optionally a phenyl-containing polysiloxane; the composition further restricted in that there must be present greater than 2 percent by weight of phenyl radicals based on the weight of the cured composition, said phenyl radical being present in either the vinyldiorganosiloxy endblocked polydiorganosiloxane, the crosslinking agent, or phenyl-containing polysiloxane separately or in combination.

25. An improved automotive ignition cable of the type having a controlled resistivity, electrically conductive member covered with an electrically insulating material wherein the improvement comprises the use of a conductive member consisting essentially of electrically non-conducting fibers bonded together and coated with a cured electrically conductive composition where the composition in the uncured state consists essentially of a curable vinyldiorganosiloxy endblocked polydiorganosiloxane, the organic radicals being selected from the group consisting of methyl, ethyl, phenyl, and 3,3,3-trifluoropropyl radicals there being from 0 to 50 inclusive percent 3,3,3-trifluoropropyl radicals and from 0 to 50 inclusive percent phenyl radicals, all percentages of radicals being based on the total number of organic radicals in the polydiorganosiloxane; greater than 15 percent by weight, based on the weight of the composition, of carbonaceous particles of less than 20 micrometers average diameter, a crosslinking agent consisting of a polyorganohydrogensiloxane having an average of at least 2.1 silicon-bonded hydrogen atoms per molecule, said molecules consisting essentially of units selected from the group consisting of $H(CH_3)SiO$ units, $R_2SiO$ units, $H(CH_3)_2SiO_{\frac{1}{2}}$ units, $R_3SiO_{\frac{1}{2}}$ units, and $SiO_2$ units, R being selected from the group consisting of alkyl radicals having from 1 to 6 carbon atoms inclusive, phenyl radicals, and 3,3,3-trifluoropropyl radicals, the amount of polyorganohydrogensiloxane being sufficient to provide from 1.2 to 3 inclusive silicon-bonded hydrogen atoms for every silicon-bonded vinyl group in the composition; a platinum-containing catalyst, soluble in the polydiorganosiloxane, and present in an amount sufficient to provide at least 1 part by weight of platinum for every one million parts by weight of the polydiorganosiloxane; an amount of a platinum catalyst inhibitor sufficient to give the desire shelf life; and optionally a phenyl-containing polysiloxane; the composition further restricted in that there must be present greater than 2 percent by weight of phenyl radicals based on the weight of the cured composition, said phenyl radical being present in either the vinyldiorganosiloxy endblocked polydiorganosiloxane, the crosslinking agent, or phenyl-containing polysiloxane separately or in combination.

26. The improved automotive ignition cable of claim 22 wherein the non-metallic fibers are electrically non-conductive.

27. The improved automotive ignition cable of claim 22 wherein the non-metallic fibers are electrically conductive.

28. The improved automotive ignition cable of claim 23 wherein the non-metallic fibers are electrically non-conductive.

29. The improved automotive ignition cable of claim 23 wherein the non-metallic fibers are electrically conductive.

30. The improved automotive ignition cable of claim 24 wherein the vinyldiorganosiloxy endblocked polydiorganosiloxane has a viscosity from 0.1 to 100 Pa.s at 25° C., and the carbonaceous particles consist of carbon or graphite particles present in an amount of between 15 and 40 percent by weight based on the weight of the composition.

31. The improved automotive ignition cable of claim 24 wherein there is present greater than 10 percent by weight phenyl radicals and the carbonaceous particles are present in an amount of between 15 and 40 percent by weight.

32. The improved automotive ignition cable of claim 25 wherein the vinyldiorganosiloxy endblocked polydiorganosiloxane has a viscosity from 0.1 to 100 Pa.s at 25° C., and the carbonaceous particles consist of carbon or graphite particles present in an amount of between 15 and 40 percent by weight based on the weight of the composition.

33. The improved automotive ignition cable of claim 25 wherein there is present greater than 10 percent by weight phenyl radicals and the carbonaceous particles are present in an amount of between 15 and 40 percent by weight.

* * * * *

UNITED STATES PATENT AND TRADEMARK OFFICE
CERTIFICATE OF CORRECTION

PATENT NO. : 4,431,982
DATED : February 14, 1984
INVENTOR(S) : Carl M. Monroe, Randall P. Sweet It is certified that error appears in the above-identified patent and that said Letters Patent is hereby corrected as shown below:

In column 2, line 13, "o" should read -- of --.

In column 9, line 19, "$R_3Si_{0.5}$" should read -- $R_3SiO_{0.5}$ --.

In column 10, line 26, "chosed" should read -- chosen --.

In column 14, line 47, "block" should read -- black --.

In column 16, Table II, column "C", the value for 96 hours should read -- 480 -- and the value for 168 hours should read -- 470 --.

In column 16, line 27, "illustrate" should read -- illustrates --.

In column 21, line 31, "phenyl-coating" should read --phenyl-containing --.

Signed and Sealed this

Fifth Day of March 1985

[SEAL]

Attest:

DONALD J. QUIGG

Attesting Officer    Acting Commissioner of Patents and Trademarks